US010730358B2

(12) United States Patent
Marking et al.

(10) Patent No.: US 10,730,358 B2
(45) Date of Patent: *Aug. 4, 2020

(54) SHOCK ABSORBER

(71) Applicant: Fox Factory, Inc., Scotts Valley, CA (US)

(72) Inventors: John Marking, El Cajon, CA (US); Vegard Hamso, El Cajon, CA (US)

(73) Assignee: Fox Factory, Inc., Braselton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/246,133

(22) Filed: Jan. 11, 2019

(65) Prior Publication Data
US 2019/0143779 A1    May 16, 2019

Related U.S. Application Data

(63) Continuation of application No. 14/488,894, filed on Sep. 17, 2014, now Pat. No. 10,183,539.

(51) Int. Cl.
*F16F 9/06*       (2006.01)
*F16F 9/34*       (2006.01)
*B60G 15/12*    (2006.01)
*F16F 9/346*    (2006.01)
*B60G 15/06*    (2006.01)

(52) U.S. Cl.
CPC ........... *B60G 15/12* (2013.01); *B60G 15/065* (2013.01); *F16F 9/062* (2013.01); *F16F 9/067* (2013.01); *F16F 9/346* (2013.01); *B60G 2202/314* (2013.01); *B60G 2206/41* (2013.01); *B60G 2500/10* (2013.01)

(58) Field of Classification Search
CPC ... F16F 9/06; F16F 9/062; F16F 9/346; B60G 15/12; B60G 15/065; B60G 2202/314; B60G 2206/41; B60G 2500/10
See application file for complete search history.

(56) References Cited

U.S. PATENT DOCUMENTS

| | | | |
|---|---|---|---|
| 4,307,875 A | 12/1981 | Freitag et al. | |
| 6,047,839 A | 4/2000 | Huggins | |
| 6,415,895 B2 | 7/2002 | Marking et al. | |
| 7,513,490 B2 | 4/2009 | Robertson | |
| 7,628,259 B2 * | 12/2009 | Norgaard | F16F 9/3235 188/314 |
| 8,376,159 B2 | 2/2013 | Mombour | |
| 8,443,948 B2 | 5/2013 | Rottenberger et al. | |

(Continued)

*Primary Examiner* — Bradley T King
*Assistant Examiner* — James K Hsiao

(57) ABSTRACT

A shock absorber including: a first cylinder having an interior, first and second ends and defining an axis, wherein the interior includes a damping fluid chamber and a damping piston movably mounted therein for movement between the first and second ends, wherein the damping piston is mounted on a first end of a shaft, wherein the first end of the shaft is movably retained within the interior of the first cylinder; first and second bypass openings configured for opening into the damping fluid chamber at first and second axially spaced-apart positions; a bypass channel fluidly coupling the first and second bypass openings; a fluid metering valve; and a floating piston dividing a portion of the shock absorber into a gas chamber and the reservoir chamber, wherein the fluid metering valve and the floating piston define the reservoir chamber there between.

4 Claims, 12 Drawing Sheets

(56) References Cited

U.S. PATENT DOCUMENTS

| | | | |
|---|---|---|---|
| 8,801,017 B2* | 8/2014 | Ellifson | B60G 13/08 |
| | | | 280/124.161 |
| 9,033,122 B2* | 5/2015 | Ericksen | B62K 25/08 |
| | | | 188/282.4 |
| 10,576,803 B2 | 3/2020 | Marking et al. | |
| 2002/0117366 A1* | 8/2002 | Casellas | F16F 9/3214 |
| | | | 188/322.15 |
| 2004/0094376 A1 | 5/2004 | Van Wonderen et al. | |
| 2010/0126812 A1 | 5/2010 | Rottenberger et al. | |
| 2010/0244340 A1 | 9/2010 | Wootten et al. | |
| 2010/0308516 A1 | 12/2010 | Galasso et al. | |
| 2011/0079569 A1 | 4/2011 | Mombour | |
| 2011/0296981 A1 | 12/2011 | Chou | |
| 2012/0048665 A1 | 3/2012 | Marking | |

\* cited by examiner

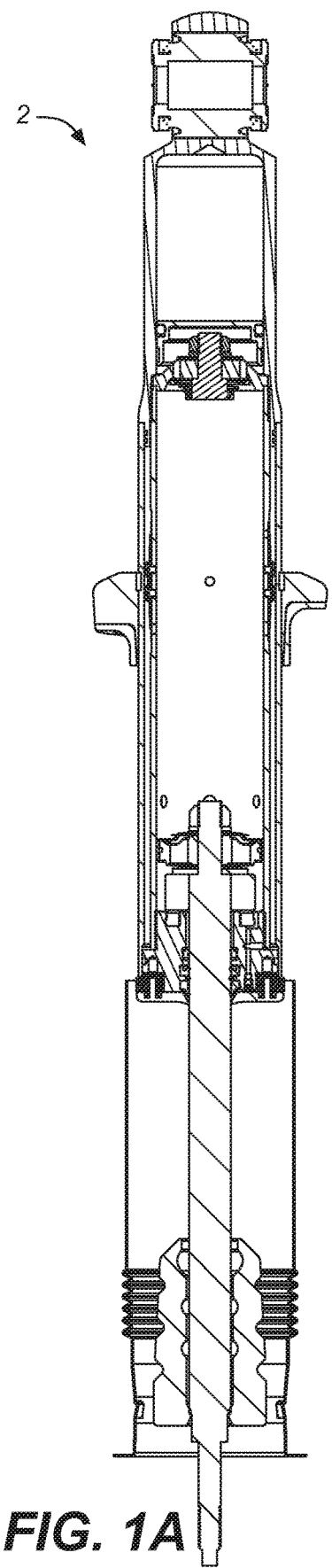
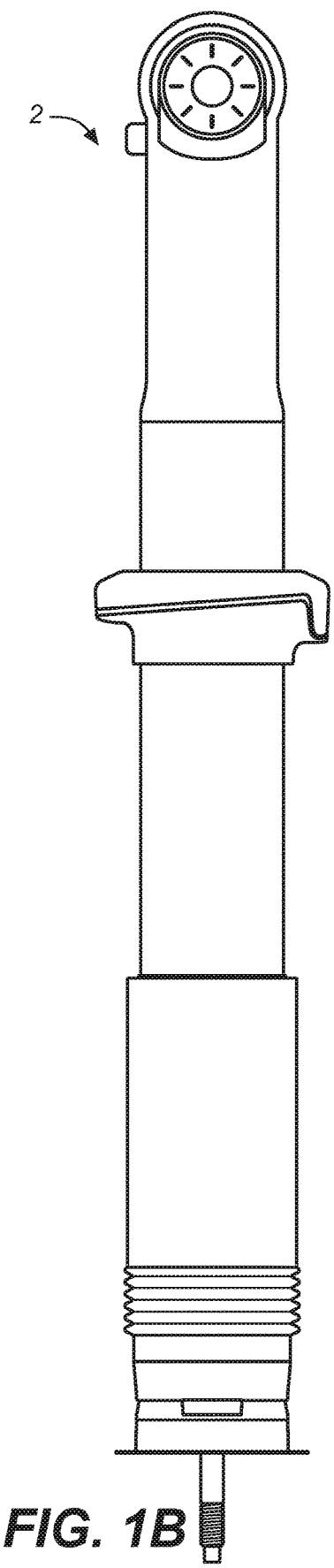
FIG. 1A
FIG. 1B

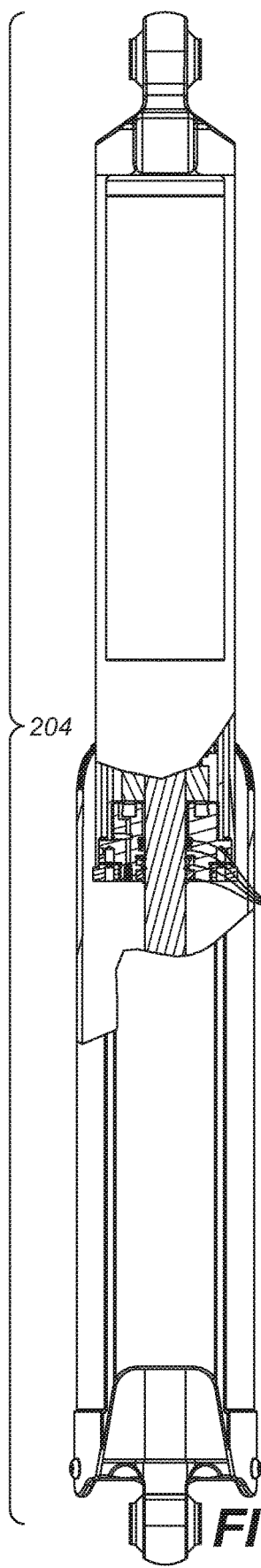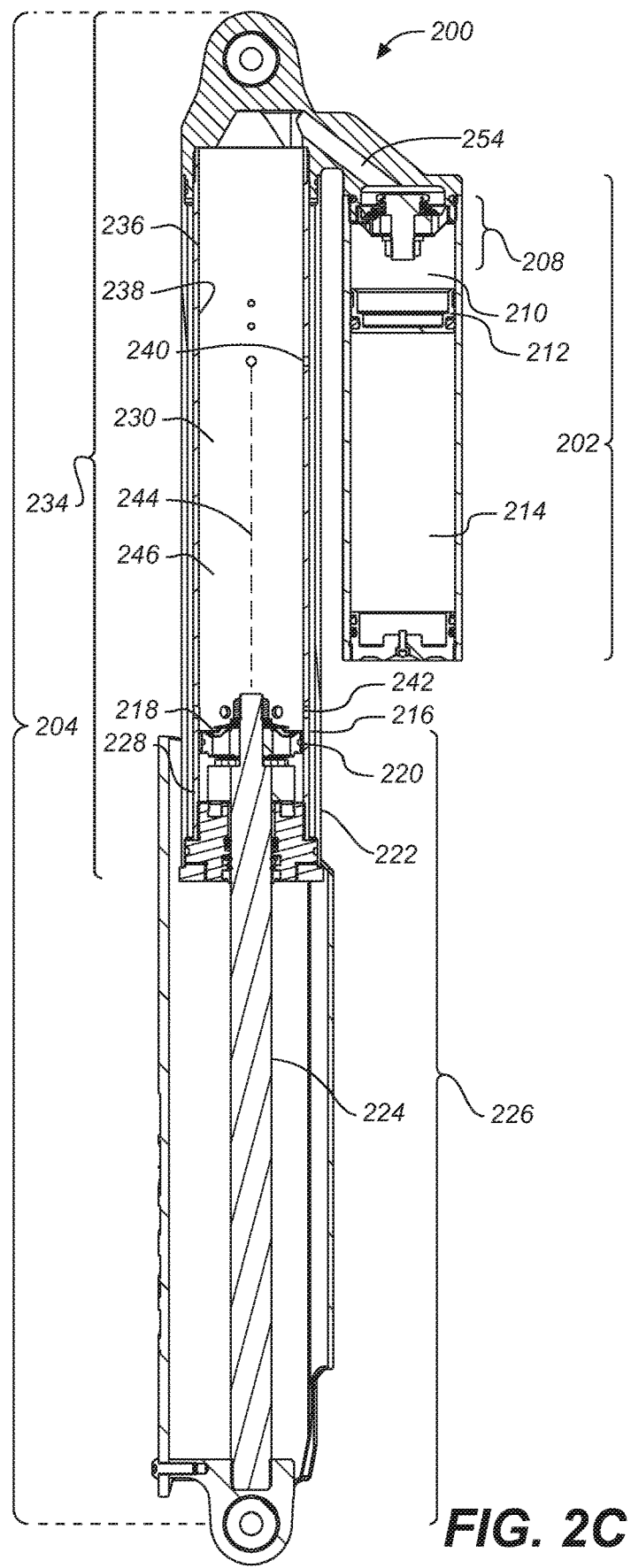
*FIG. 2B*  *FIG. 2C*

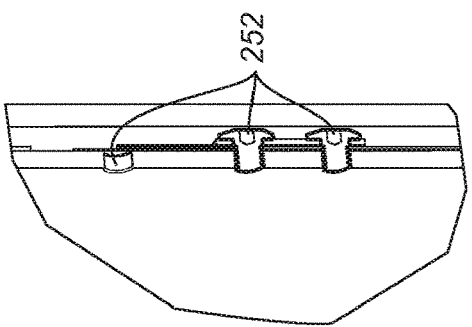
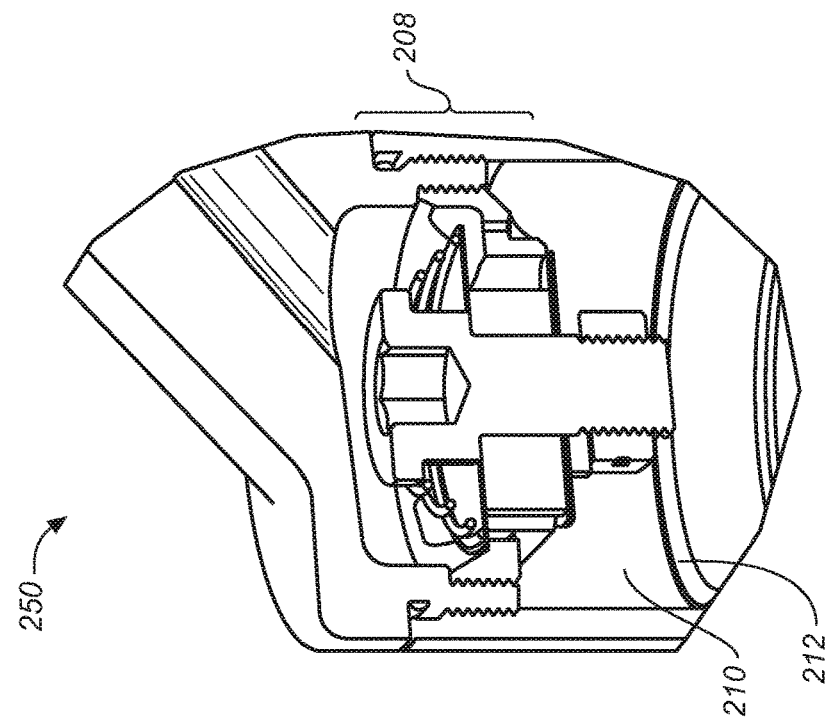
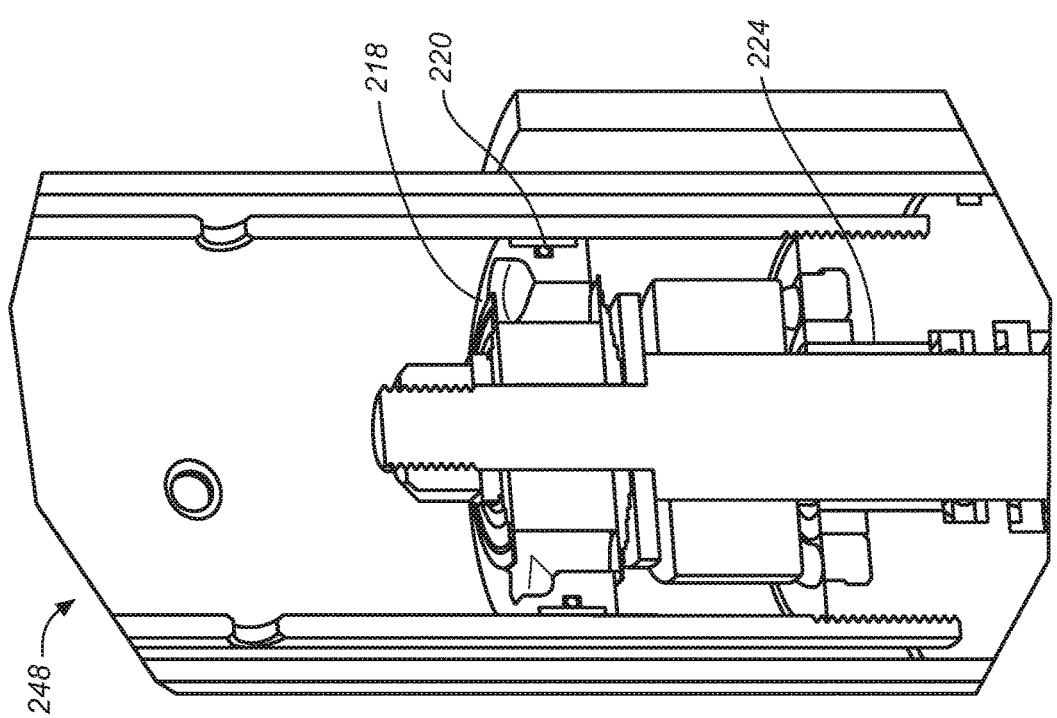

SHOCK ABSORBER

CROSS-REFERENCE TO RELATED APPLICATIONS

This application is a continuation application of and claims the benefit of co-pending U.S. patent application Ser. No. 14/488,894 filed on Sep. 17, 2014, entitled "SHOCK ABSORBER", by John Marking et al., and assigned to the assignee of the present application, and is hereby incorporated by reference in its entirety herein.

This application is related to U.S. patent application Ser. No. 16/246,217 filed concurrently herewith, entitled "SHOCK ABSORBER" by John Marking et al., and assigned to the assignee of the present application, which is incorporated herein by reference in its entirety.

BACKGROUND

Field of the Invention

The present invention relates to shock absorbers.

Description of the Related Art

Many types of suspensions and supports include a spring and a damping device to help isolate that supported from the support structure or surface. For example, automotive vehicles commonly use separate springs and simple shock absorbers to support the vehicle frame on the axle assemblies. Simple shock absorbers are typically oil-filled cylinders within which a vented piston is mounted. The piston is connected is connected to a shaft which extends out of one end of the cylinder. The outer end of the shaft is mounted to one point on the vehicle and the other end of the cylinder is mounted to another point on the vehicle in parallel with the suspension spring. Thus, simple shock absorbers only provide damping and not support.

Another type of shock absorber, which is the type commonly used with motorcycles, off-road vehicles, competition automotive vehicles and off-road bicycles, combines both the suspension function and the shock absorbing function in one unit. This second type of shock absorber commonly uses a spring unit to provide the suspension function and is coupled with a damping unit to provide the damping function.

Typical shock absorbers (also referred to as shocks) provide two kinds of damping: compression damping ("CD"), and rebound damping ("RD"). One refers to a damping force created during an "inward" travel of the shaft (shortening of the shock), the other refers to damping force created during an "outward" travel of the shaft (lengthening of the shock). Generally, but not always—depending on the linkage connecting the shock to the vehicle, RD applies during outward motion and CD applies during inward motion. Some shocks are externally adjustable by the user to provide for RD and/or CD adjustment.

Piston-type shock absorbers can be designed to provide the same amount of damping during both the compression stroke and the rebound stroke. Alternatively, the fluid passageways through the vented, damping piston can be designed so that the restriction to fluid flow through the damping piston during the compression stroke is different than the restriction to fluid flow during the rebound stroke. In this case, the damping during the entire compression stroke is different than the damping during the entire rebound stroke.

Further, in a typical fluid operated damper, the damping fluid flow is inhibited by forcing fluid through a restrictive area or orifice, which effectively slows the movement of the damper during compression and rebound strokes.

During some instances of operation, conventional shock absorbers, and therefore the vehicle rider, experience cavitation, during which the shaft of the shock absorber moves into the damping fluid chamber at its full travel length without providing any damping function. What is needed is a simple solution for reducing cavitation in a shock absorber.

BRIEF DESCRIPTION OF THE DRAWINGS

Aspects of the present invention are illustrated by way of example, and not by way of limitation, in the accompanying drawings, wherein:

FIG. 1A is a side cross-sectional view of a concentric cylinder bypass damper for positioning in the front of a vehicle and with the piston in a rest position prior to a beginning of a compression stroke, in accordance with an embodiment.

FIG. 1B is a side perspective view of the concentric cylinder bypass damper of FIG. 1A, in accordance with an embodiment.

FIG. 2B depicts a side view of a concentric cylinder bypass damper to be positioned in the rear of a vehicle, wherein a portion of the side view is a perspective view and another portion of the side view is a cross-sectional view showing springs therein, in accordance with an embodiment.

FIG. 2C depicts a cross-sectional side view of a concentric cylinder bypass damper to be positioned in the rear of a vehicle, in accordance with an embodiment.

FIG. 2E depicts the piston assembly of FIG. 2D, in accordance with an embodiment.

FIG. 2F depicts the fluid metering valve/floating piston assembly of FIG. 2D, in accordance with an embodiment.

FIG. 2G depicts the set of bypass openings of FIG. 2D, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Overview of Discussion

Example shock absorbers that provide various degrees of damping are described herein. Discussion begins with a description of embodiments of the present technology, and more particularly, concentric cylinder bypass dampers. See FIGS. 1A, 1B, 1C, 1D, 1E, 1F, 1G, 1H, 1I, 1J and 1K (a front shock absorber) and FIGS. 2A, 2B, 2C, 2D, 2E, 2F and 2G (a rear shock absorber). Following, a shock absorber that includes the concentric cylinder bypass damper integrated with an air spring is described. See FIGS. 3A, 3B, 3C, 3D, and 3E.

Example Concentric Cylinder Bypass Damper

Figure 1C:
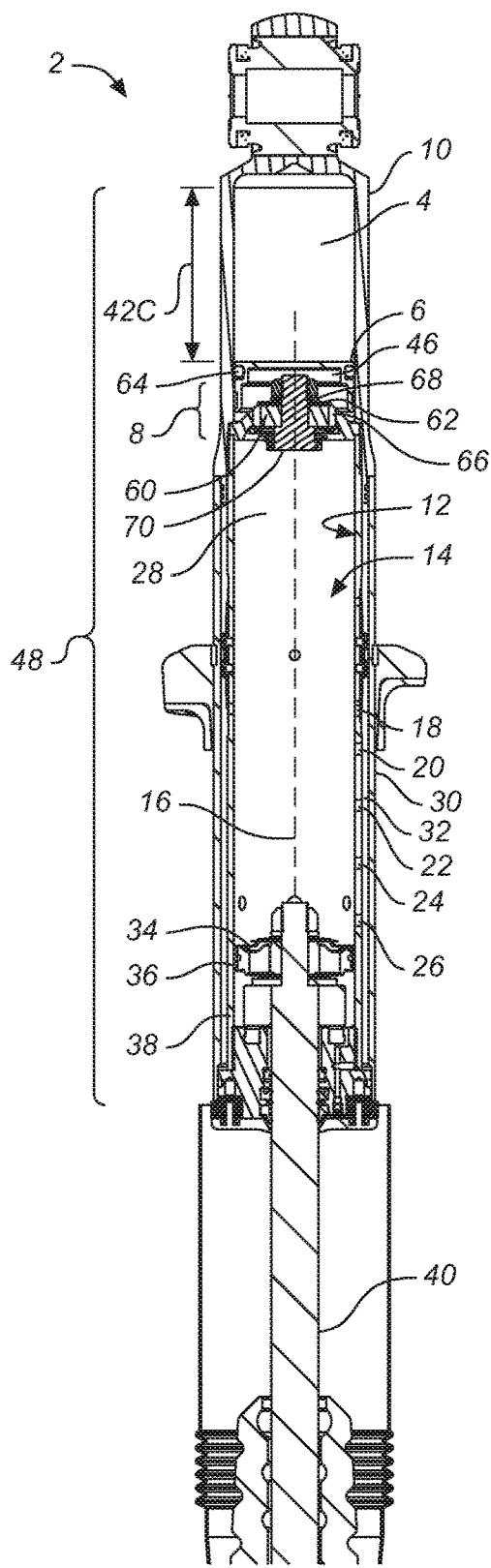
FIG. 1C depicts an enlarged view of the concentric cylinder bypass damper of FIG. 1A, in accordance with an embodiment.

FIGS. 1A-1K depict a concentric cylinder bypass damper of a shock absorber, in accordance with embodiments, for positioning in the front suspension system of a vehicle. More particularly and as will be described herein, FIG. 1A is a side cross-sectional view of a shock absorber with a piston in a rest position prior to a beginning of a compression stroke, in accordance with an embodiment. FIG. 1B is a side perspective view of the shock absorber of FIG. 1A, in accordance with an embodiment.

FIG. 1C is an enlarged view of the concentric cylinder bypass damper 48 of the shock absorber 2 of FIG. 1A, in accordance with an embodiment. The concentric cylinder bypass damper 48 includes a cylinder 12 having an interior 28, first and second ends, 38 and 10, respectively, and defining an axis 16. A floating piston 6 and a fluid metering valve 8 divide the interior 28 into a damping fluid chamber 14 and a gas chamber 4. The gas chamber 4, the floating piston 6 and the fluid metering valve 8 accommodate the volume of oil or other damping fluid within the damping fluid chamber 14 that is displaced by the movement of the shaft 40 into the damping fluid chamber 14. In other words, when the shaft 40 moves into the damping fluid chamber 14, some of the fluid within the damping fluid chamber 14 is displaced and travels through the fluid metering valve 8 and into the reservoir chamber 46 that is positioned between the fluid metering valve 8 and the floating piston 6. The more fluid that enters the reservoir chamber 46, the more that the floating piston 6 is pushed into the gas chamber 4, such that the gas within the gas chamber 4 becomes more compressed than was its state without the entry of the floating piston 6 into the gas chamber 4. The compression of the gas within the gas chamber 4 is suggested by the arrows 42C-42G in FIGS. 1A-1G.

Of note, while FIGS. 1C-1J show a fluid metering valve (fluid metering valve 8) having a particular set of components that will be explained below, it should be appreciated that the fluid metering valve may include one or more valves, having a different structure than that shown with respect to the fluid metering valve 8, that regulate fluid moving there through, thereby facilitating a damping effect. In one embodiment, and as shown, the fluid metering valve 8 is positioned adjacent to the floating piston 6. The fluid metering valve 8, in one embodiment, includes a compression piston 60, a shaft 70 and a set of shim stacks 62 that removably cover one or more passages 66 through the compression piston 60. For example, and with reference to FIG. 1C, as the shaft 40 moves into the damping fluid chamber 14, the damping fluid moves through the or more passages 66 within the compression piston 60 and past the shim stack 62 covering the one or more passages 66, into the reservoir 46. The shim stack 62 deflects about the spacer 68 and moves to selectively open the one or more passages 66.

Of note, the seal member 64 adjacent to the floating piston 6 provides a substantially fluid tight seal between the floating piston 6 and the interior surface of the cylinder 12. In one embodiment, the seal member 64 is an annular seal having a substantially square cross-section. However, other suitable seals may also be used.

A damping piston 34 is moveably mounted within the cylinder 12 for moving between the first and second ends, 38 and 10, respectively, of the cylinder 12. A number of axially separated bypass openings 18, 20, 22, 24 and 26 are formed through the cylinder 12. Of note, there may be more or less bypass openings than those described as bypass openings 18, 20, 22, 24 and 26. A bypass cylinder 30 surrounds the cylinder 12 and defines a cylindrical bypass channel 32 there between. In one embodiment, all of the bypass openings are open 18, 20, 22, 24 and 26, which enables the same damping characteristics to occur along the same segment of the stroke, whether the stroke is the compression stroke or the rebound stroke. The bypass openings 18, 20, 22, 24 and 26 that are open fluidly couple the damping fluid chamber 14 and the cylindrical bypass channel 32 to permit some damping fluid to bypass the damping piston 34 when the damping piston 34 is positioned between these bypass openings 18, 20, 22, 24 and 26, thus reducing the damping effect during this portion of the stroke. In other embodiments, some of the bypass openings 18, 20, 22, 24 and 26 are always open, while other bypass openings of the bypass openings 18, 20, 22, 24 and 26 have expandable bands positioned within annular grooves formed in the outer surface of the cylinder 12, such as those expandable bands and annular grooves shown in U.S. Pat. No. 6,415,895, POSITION-SENSITIVE SHOCK ABSORBER, by Marking et al., assigned to Fox Factory, Inc., and incorporated herein in its entirety by reference thereto. In this situation, the expandable bands block the bypass openings. The expandable bands permit fluid flow from the damping fluid chamber 14 to the cylindrical bypass channel 32, but restrict, and typically prevent, fluid flow in the opposite direction. Thus, the shock absorber 2 will exhibit different damping characteristics along the same segment of the stroke depending upon whether the stroke is a compression stroke or a rebound stroke.

Figure 1D:
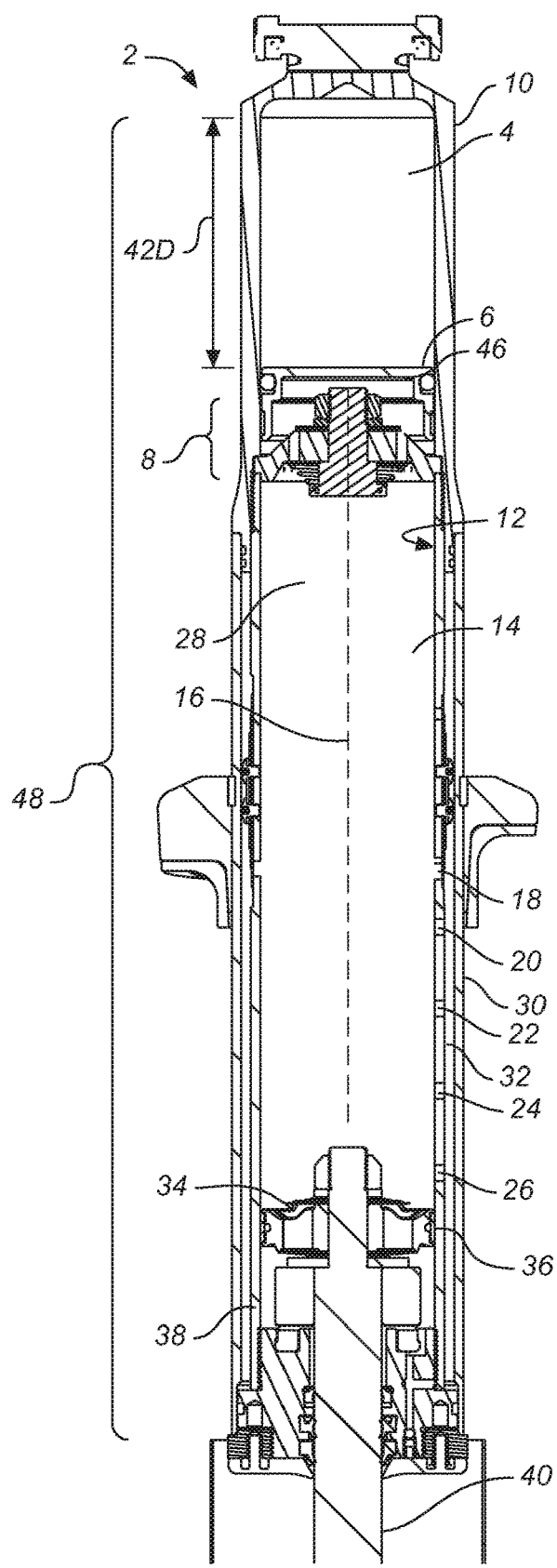
FIG. 1D depicts an enlarged view of the concentric cylinder bypass damper of FIG. 1C in a resting position, in accordance with an embodiment.
Figure 1E:
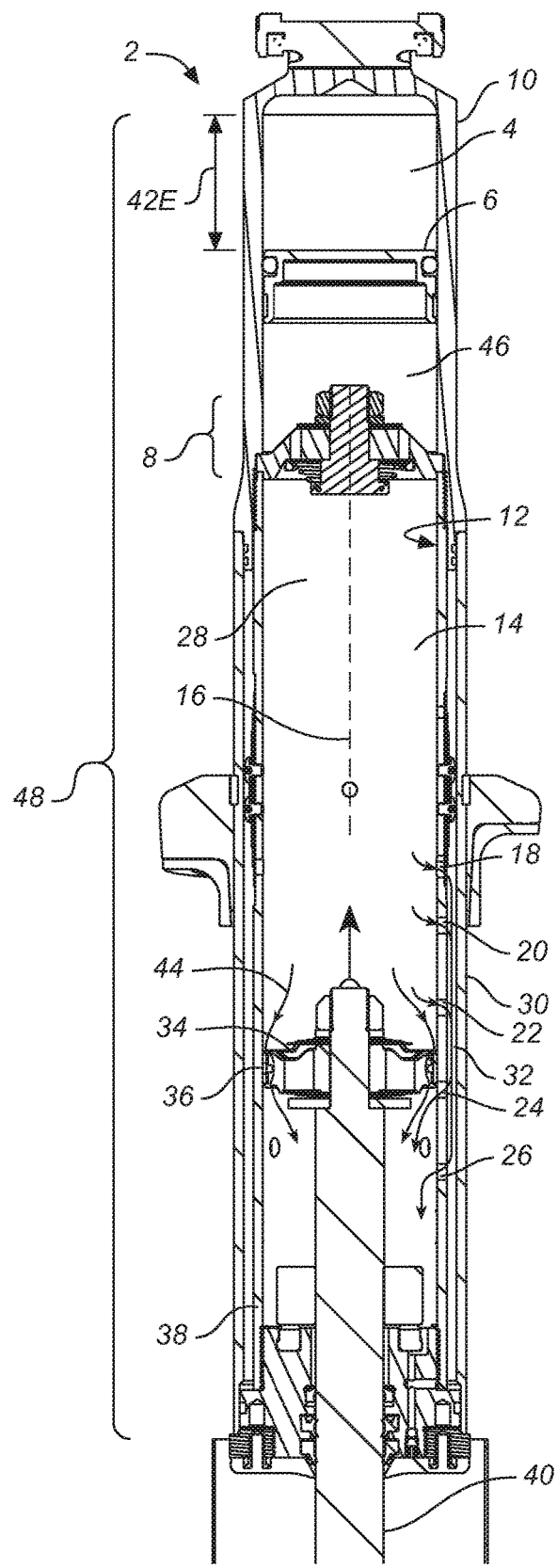
FIG. 1E depicts an enlarged view of the concentric cylinder bypass damper of FIG. 1C, wherein a compression stroke is occurring and the damping piston seal has passed some bypass openings, in accordance with an embodiment.

FIG. 1D illustrates an enlarged view of FIG. 1C, in accordance with an embodiment, wherein the damping piston 34 is at rest adjacent to the first end 38 of the cylinder 12. The movement of the damping piston 34 upwardly, that is in the compression stroke, is dampened only by the flow of damping fluid through the damping piston 34, until the damping piston seal 36, which contacts and seals against the interior 28 of the cylinder 12, passes the bypass opening 26. When this occurs, fluid flow can be both through the damping piston 34, which is vented (see arrows depicting fluid moving through the damping piston 34), and also can bypass the damping piston 34 through the bypass openings 18, 20 and 22, along the bypass channel 32 and back through the bypass openings 24 and 26, as is illustrated in FIG. 1E, in accordance with an embodiment (See arrows 44 of FIG. 1E). This 3/2 zone (a flow through 3 bypass openings and 2 bypass openings on either side of the damping piston 34) provides the softest (least amount of damping) zone of the compression stroke.

Figure 1F:
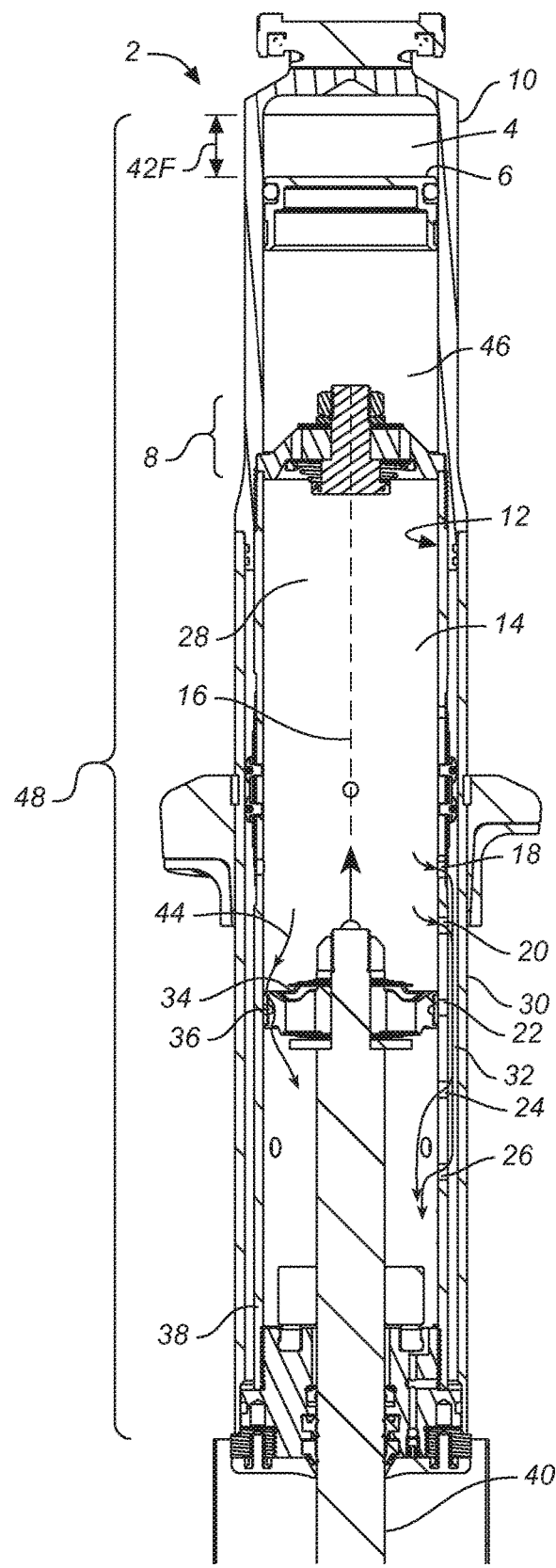
FIG. 1F depicts an enlarged view of the concentric cylinder bypass damper of FIG. 1C, wherein a compression stroke is occurring and the damping piston seal has passed some bypass openings, in accordance with an embodiment.

The next zone of the compression stroke is created when the damping piston seal 36 covers the bypass opening 22 as shown in FIG. 1F. This 2/2 zone of the compression stroke is still soft, but not as soft as that shown in FIG. 1E. Some fluid flows through the damping piston 34 and also bypasses the damping piston 34 through the bypass openings 18 and 20, through the cylindrical bypass channel 32 and out the bypass openings 24 and 26 into the chamber below the damping piston 34 (See arrows 44 of FIG. 1F). The 2/2 zone of FIG. 1F continues until the bypass opening 20 is covered by the damping piston seal 36. This creates a short 1/2 zone (not illustrated) until the damping piston seal 36 covers the bypass opening 20. Continued compression stroke movement, wherein the damping piston seal 36 passes or covers bypass opening 18, shown in FIG. 1G, results in a 0/0 zone (no fluid bypasses the damping piston 34). As shown by the arrows 44 of FIG. 1G, the fluid flows through the damping piston 34.

The rebound stroke, not shown, exhibits no bypass fluid flow (a 1/1 zone) until the damping piston seal 36 passes the bypass opening 18. At this point, the fluid flow is out through the bypass openings 22, 24 and 26 (bypass opening 20 being covered by the damping piston seal 36) and back in through the bypass opening 18 for a 3/1 zone. After the damping piston seal 36 passes the bypass opening 20, the bypass zone becomes a 3/2 zone (or remains 3/1 if, for example, a flow valve is positioned at the bypass opening 20). Once the damping piston seal 36 covers the bypass opening 22, the bypass zone is a 2/2 zone until the damping piston seal 36 covers the bypass opening 24. With the bypass opening 24 covered but the bypass opening 26 open, the fluid can pass through the bypass openings 26, leaving a 1/4 zone. Once the damping piston seal 36 covers the bypass opening 26, no bypass occurs, and is a 0/0 zone.

Thus, it is seen that the amount of the damping fluid bypass varies along both the compression and rebound strokes and may be different along the same segments of the cylinder on the compression and rebound strokes.

Conceptually, the damping piston (referred to heretofore, as "vented damping piston") could by non-vented (solid) with all the damping fluid channeled through the bypass openings or vented, wherein the damping fluid passes there through.

As indicated above, according to embodiments, the fluid metering valve may include any valve (or valves) structure that is capable of restricting a flow of fluid through one or more passageways that are disposed within one or more pistons, wherein this valve structure(s) includes one or more shim stacks that removably block/seal the one or more passageways. As noted and according to embodiments, the fluid metering valve, as shown with respect to the fluid metering valve 8 shown in FIGS. 1C-1J, is positioned between the damping fluid chamber 14 and the floating piston 6 of the concentric cylinder bypass damper 48 of a shock absorber 2.

With reference now to FIG. 1E, it can be seen that the damping piston 34, attached to the shaft 40, is entering the interior 28 of the cylinder 12, thereby pushing its way into the damping fluid chamber 14. The fluid within the damping fluid chamber 14 is compressed due to the entry of the shaft 40 into the damping fluid chamber 14. As described herein, due to the pressure on the fluid caused by the entry of the shaft 40 into the damping fluid chamber 14, damping fluid flows from one side of the damping piston 34 to the other side of the damping piston 34, through both the damping piston 34 and the cylindrical bypass channel 32.

In a situation in which a compression of a shock absorber occurs very quickly, the fast movement of the fluid through the channels of the damping piston and/or the bypass openings may cause a cavitation to occur. However, features of the present technology reduce cavitation and its effects during the compression and rebound of a shock absorber that include a structure that distributes the flow of the fluid, through a damping piston that may be vented, through various bypass openings, and through a fluid metering valve.

For example, a first pressure drop occurs through the flow of a portion of the fluid through the damping piston 34 and/or through one or more bypass openings 18, 20, 22, 24 and 26. A second pressure drop occurs through the flow of fluid through the fluid metering valve 8 and into the reservoir chamber 46. A further source of pressure drop is caused by the floating piston 6 moving toward the gas chamber 4 in response to the increased pressure within the reservoir chamber 46 caused by the movement of fluid therein. Thus, because the pressure drop is enabled via embodiments described herein, the likelihood of the vehicle rider experiencing cavitation effects is reduced. Additionally, at high enough velocities, any cavitation that occurs will be of a reduced magnitude versus a standard conventional signal pressure drop flow regime.

With reference now to FIGS. 1D-1G, the fluid flow through the concentric cylinder bypass damper 48 is explained, in accordance with embodiments. As seen in FIG. 1D, the damping piston 34 is shown at rest adjacent to the first end 38 of the cylinder 12. In this position, the floating piston 6 remains at rest and adjacent to the fluid metering valve 8, with the reservoir chamber 46 there between.

However, as shown in FIG. 1E, when the shaft 40, during a compression stroke, moves upward into the interior 28 of the cylinder 12, the damping piston 34, which is attached to the shaft 40, also moves upwards into the interior 28 of the cylinder 12. The upward movement of the damping piston 34 causes, in one embodiment and as described herein, the damping fluid to flow through the bypass openings, such as bypass openings 18, 20, 22, 24 and 26, from the interior 28 above the damping piston 34, through the cylindrical bypass channel 32, and into the interior 28 below the damping piston 34. In another embodiment, the damping fluid not only flows through the bypass openings, but also through the damping piston 34, which is vented. Sometimes, the force of an impact upon the vehicle, which is translated to the concentric cylinder bypass damper 48, causes the shaft 40, and hence also the damping piston 34 to move upwards into the interior 28 of the cylinder 12 at such a velocity that the bypass openings and the damping piston 34 that is vented do not create enough passageways for the damping fluid to become dispersed quickly enough to reduce the damping effect of the concentric cylinder bypass damper 48, as well as provide enough dispersal of the damping fluid such that cavitation is avoided. A ride that is softer than what the bypass openings and the damping piston 34 that is vented can provide is desired.

Embodiments of the present technology provide a third fluid dispersal mechanism, in addition to the bypass openings and the damping piston (that, one embodiment, is vented). Embodiments provide a reservoir chamber 46 in fluid communication with the damping fluid chamber 14, via a fluid metering valve 8. A floating piston 6 is slidably engaged with the inner surface of the cylinder 12 and separates the reservoir chamber 46 from the gas chamber 4. In other words, the floating piston 6 is mounted on the inner surface of the cylinder 12 such that it may slide up and down the cylinder 12 while remaining in a position between the reservoir chamber 46 and the gas chamber 4.

In operation, in one embodiment and with reference to FIG. 1E, the concentric cylinder bypass damper 48 is compressed such that the interior 28 of the cylinder 12 experiences the entry of a portion of the shaft 40 and the damping piston 34 therein. The entry of the portion of the shaft 40 and the damping piston 34 occurs at such a rate that the damping fluid within the damping fluid chamber 14 is displaced and pushed through the bypass openings, the vents through the damping piston 34, and the passageways through the fluid metering valve 8. Thus, a portion of the damping fluid moves from the damping fluid chamber 14, through the fluid metering valve 8, and into the reservoir chamber 46. By enabling the floating piston 6 to move (slide) upwards into the gas chamber 4, the floating piston 6 and the gas chamber 4 are able to accommodate the volume of the oil or other damping fluid displaced into the reservoir chamber 46. Arrows 42E show that the dimension measurements of the gas chamber 4 at FIG. 1E are smaller (when the shaft 40 and the damping piston 34 have moved upwards into the interior 28 of the cylinder 12) than the dimension measurements of the gas chamber 4 of FIG. 1D (shown by arrows 42D) when the shaft 40 and the damping piston 34 are at rest. In other words, the gas chamber 4 of FIG. 1E is more compressed than that gas chamber 4 shown in FIG. 1D, due to the entry of the shaft 40 and damping piston 34 into the interior 28 of the cylinder 12.

FIG. 1F shows a further entry of the shaft 40 and the damping piston 34 into the interior 28 of the cylinder 12. More damping fluid has moved from the damping fluid chamber 14 and to the reservoir chamber 46 (as well as the interior 28 of the cylinder 12 that is below the damping piston 34). FIG. 1F also shows that the gas chamber 4 has continued to compress (as compared to the compression of the gas chamber 4 shown at FIG. 1E) as the floating piston 6 continues to move upwards. The floating piston 6 is being pushed by the damping fluid that was displaced from the damping fluid chamber 14 and into the reservoir chamber 46.

Figures 1G, 1H:
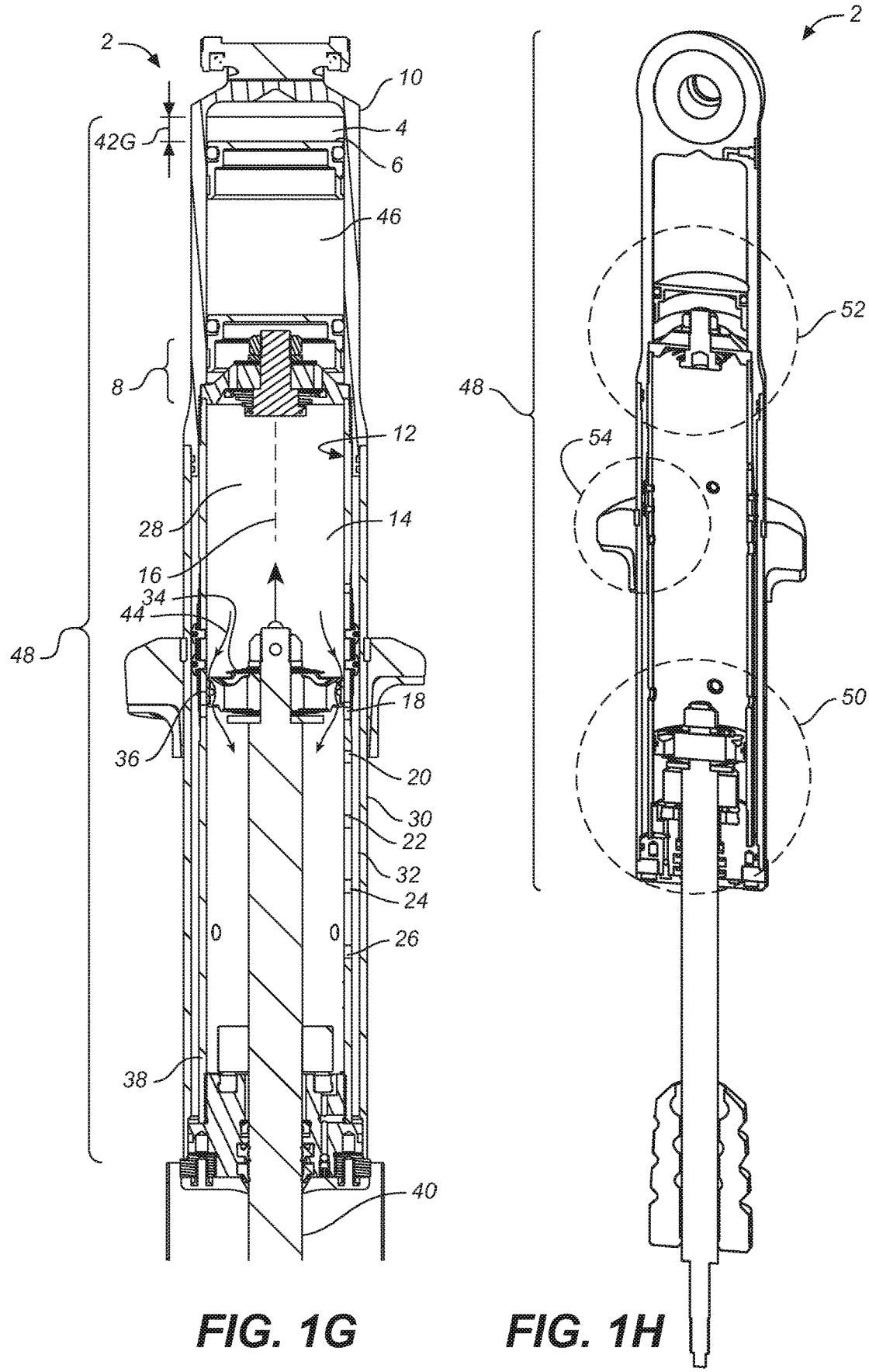
FIG. 1G depicts an enlarged view of the concentric cylinder bypass damper of FIG. 1C, wherein a compression stroke is occurring and the damping piston seal has passed all of the bypass openings, in accordance with an embodiment.
FIG. 1H depicts a side cross-sectional view of the shock absorber of FIG. 1A, in accordance with an embodiment.

FIG. 1G shows a further entry of the shaft 40 and the damping piston 34 into the interior 28 of the cylinder 12. More damping fluid has moved from the damping fluid chamber 14 and to the reservoir chamber 46 (as well as the interior 28 of the cylinder 12 that is below the damping piston 34). FIG. 1G also shows that the gas chamber 4 has continued to compress (as compared to the compression of the gas chamber 4 shown at FIG. 1F) as the floating piston 6 continues to move upwards. The floating piston 6 is being pushed by the damping fluid that was displaced from the damping fluid chamber 14 and into the reservoir chamber 46.

Thus, the fluid metering valve 8 provides an added dispersal mechanism by which the damping fluid within the damping fluid chamber 14 may be displaced, upon the entry of the shaft 40 and the damping piston 34 into the interior 28 of the cylinder 12. The fluid metering valve 8 thus, through the dispersal of a further portion of the damping fluid from within the damping fluid chamber 14, softens the vehicle ride by further reducing the damping provided by the shock absorber 2, and reduces the possibility of cavitation. Additionally, the ability of the floating piston 6 to move and compress the gas chamber 4 and thereby accommodate the volume of oil or other damping fluid within the reservoir chamber 46, further softens the vehicle ride by further reducing the damping provided by the shock absorber 2, and thus further reducing the possibility of cavitation.

FIG. 1H depicts a side cross-sectional view of the shock absorber of FIG. 1A, in accordance with an embodiment. The shock absorber 2 includes the concentric cylinder bypass damper 48. The concentric cylinder bypass damper 48 is shown to include the piston assembly 50 (See FIG. 1I), the fluid metering valve/floating piston assembly 52 (See FIG. 1J) and the set of bypass openings 54 (See FIG. 1K).

Figure 1K:
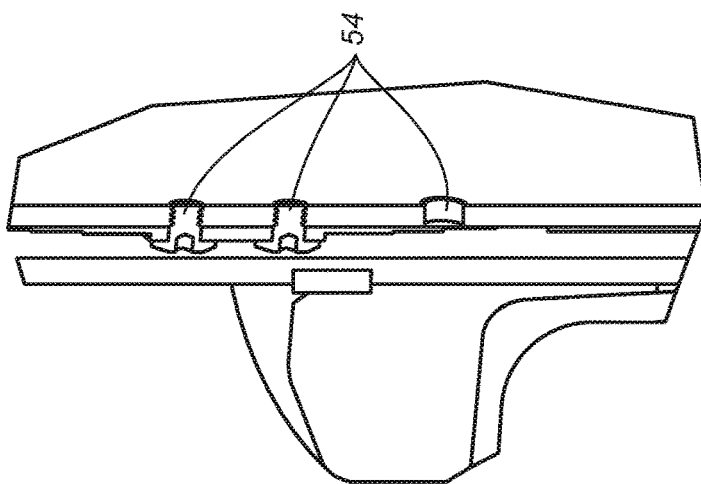
FIG. 1K depicts the set of bypass openings of FIG. 1H, in accordance with an embodiment.
Figure 1J:
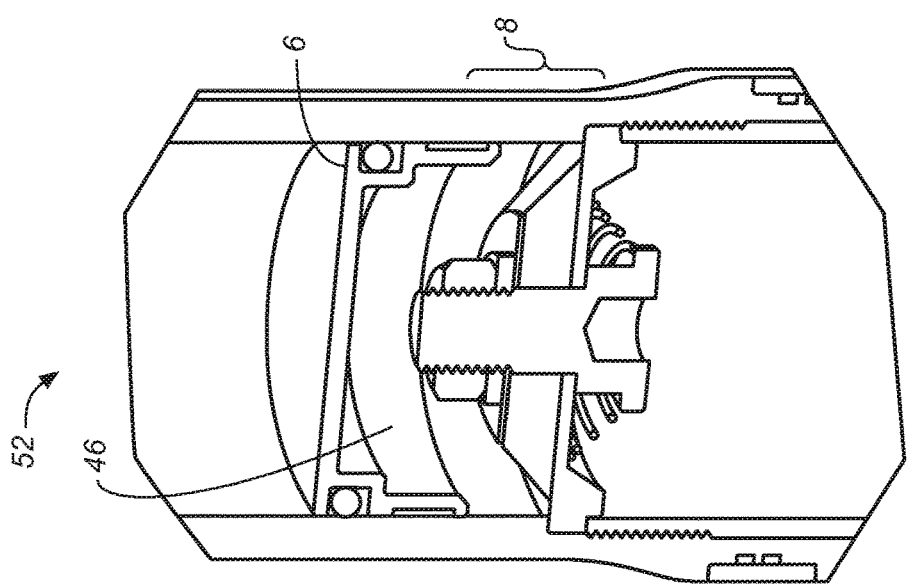
FIG. 1J depicts the fluid metering valve/floating piston assembly of FIG. 1H, in accordance with an embodiment.
Figure 1I:
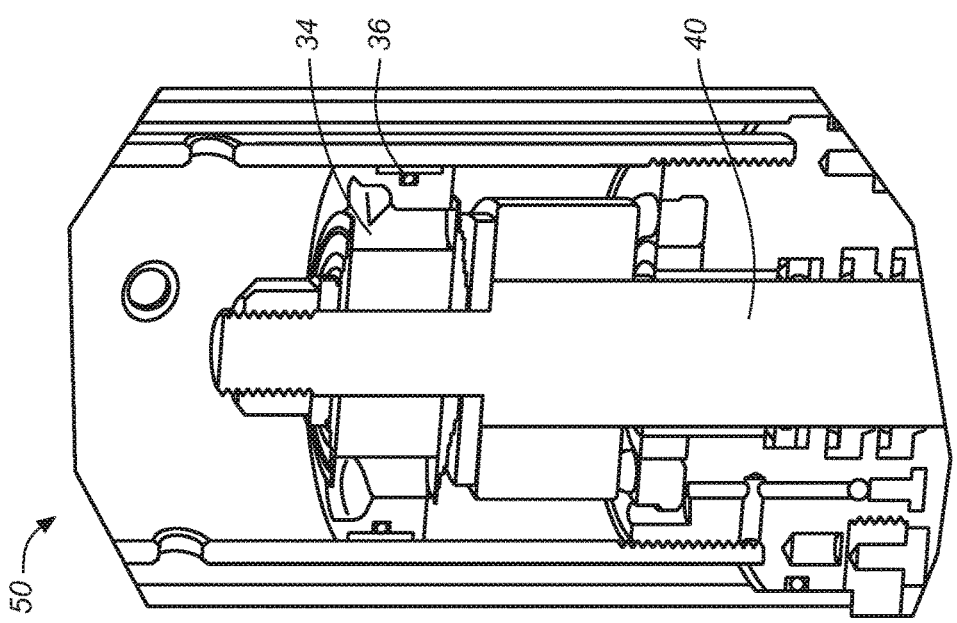
FIG. 1I depicts the piston assembly of FIG. 1H, in accordance with an embodiment.

FIG. 1I depicts the piston assembly 50 of FIG. 1H, in accordance with an embodiment. The piston assembly 50, including the damping piston 34 and the damping piston seal 36 is integrated with the shaft 40.

FIG. 1J depicts the fluid metering valve/floating piston assembly 52 of FIG. 1H, in accordance with an embodiment. The fluid metering valve/floating piston assembly 52 includes the fluid metering valve 8 and the floating piston 6, sandwiching the reservoir chamber 46.

FIG. 1K depicts a set of bypass openings 54 of FIG. 1H, in accordance with an embodiment.

Figure 2A:
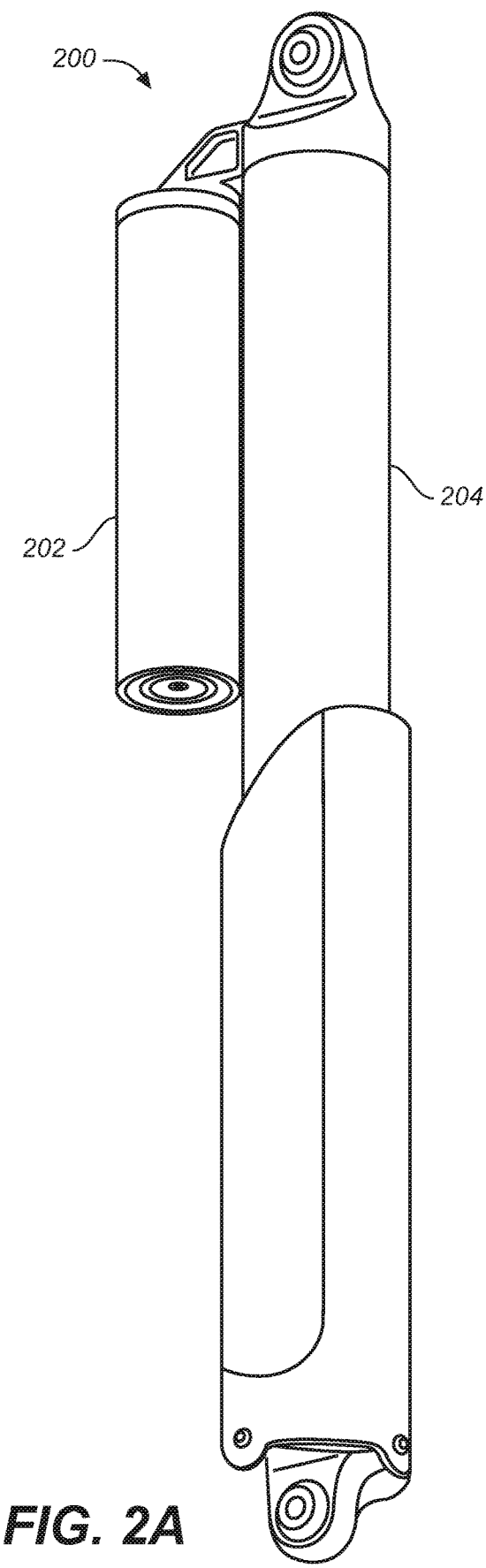
FIG. 2A depicts a perspective view of a concentric cylinder bypass damper to be positioned in the rear of a vehicle and having a remote reservoir, in accordance with an embodiment.

FIGS. 2A-2C illustrate a shock absorber for positioning in a rear of a vehicle, in accordance with embodiments. More particularly, FIG. 2A depicts a perspective view of a shock absorber 200 to be positioned in the rear of a vehicle, showing a remote reservoir 202 connected to the main body 204 of the shock absorber 200, in accordance with an embodiment.

FIG. 2B depicts a side view of the main body 104 of the shock absorber 200 to be positioned in the rear of a vehicle, wherein a portion of the side view is a perspective view and another portion of the side view is a cross-sectional view showing springs 206 therein, in accordance with an embodiment.

FIG. 2C depicts a cross-sectional side view of the main body 204 and the reservoir 202 of the shock absorber 200 to be positioned in the rear of a vehicle, in accordance with an embodiment. Of note, the springs 206 that are shown in FIG. 2B are not shown in FIG. 2C. However, it should be appreciated that the main body 204 includes a set of springs therein. The shock absorber 200 operates as both a suspension spring and as a damper. The spring may be an air spring arrangement, coil springs, or other suitable arrangements. The shock absorber 200 primarily includes an air sleeve 226, a concentric cylinder bypass damper 234 and a reservoir 202. The concentric cylinder bypass damper 234 and the reservoir 202 are connected via connection 254. In one embodiment, the connection 254 may be a hydraulic hose that physically connects the main body 204 of the shock absorber 200 to the reservoir 202. However, in another embodiment, the reservoir 202 may also be directly connected to the main body 204 of the shock absorber 200, such as being integrally connected to, or monolithically formed with, the air sleeve 226.

The concentric cylinder bypass damper 234 of the shock absorber 200 includes a cylinder 238 having an interior 246, first and second ends, 228 and 236, respectively, and defining an axis 244.

The reservoir 202 includes a fluid metering valve 208, a reservoir chamber 210, a floating piston 212 and a gas chamber 214. The fluid metering valve 208 is positioned adjacent to the connection 254. The reservoir chamber 210 is positioned between the fluid metering valve 208 and the floating piston 212. The floating piston 212 is positioned between the reservoir chamber 210 and the gas chamber 214. The gas chamber 214, the floating piston 212, the reservoir chamber 210 and the fluid metering valve 208 accommodate the volume of oil or other damping fluid that is displaced from the damping fluid chamber 230, caused by the movement of the shaft 40 and the damping piston 218 into the damping fluid chamber 14. The damping fluid is pushed through the connection 254 and into the fluid metering valve 208. From the fluid metering valve 208, the damping fluid is pushed into the reservoir chamber 210. As the volume of damping fluid increases in the reservoir chamber 210, the floating piston 212 is pushed into the gas chamber 214. Thus, the entry of the shaft 224 and the damping piston 218 into the damping fluid chamber 230 causes, amongst other events, the floating piston 212 to compress the gas chamber 215 by sliding within the reservoir 202 towards the gas chamber 214.

It should be appreciated that the components within the concentric cylinder bypass damper 234 of the (rear) shock absorber 200 operate in a similar manner to those components of the (front) shock absorber 2. For example, the concentric cylinder bypass damper 234 further includes a damping piston 218 that is vented and that is moveably mounted within the cylinder 238 for moving between the first and second ends, 228 and 236, respectively, of the cylinder 238. A number of axially separated bypass openings 240 and 242 are formed through the cylinder 238. Of note, there may be more or less bypass openings than that described as bypass openings 240 and 242. A bypass cylinder 222 surrounds the cylinder 238 and defines a cylindrical bypass channel 216. In one embodiment, all of the bypass openings 240 and 242 are open, which enable the same damping characteristics along the same segment of the stroke, whether the stroke is the compression stroke or the rebound stroke. The bypass openings 240 and 242 that are open fluidly couple the damping fluid chamber 230 and the cylindrical bypass channel 216 to permit some damping fluid to bypass the vented damping piston 218 when the vented damping piston 218 is positioned between these bypass openings 240 and 242, thus reducing the damping during this portion of the stroke. In other embodiments, some of the bypass openings 240 and 242 are always open, while other bypass openings of the bypass openings 240 and 242 have expandable bands positioned within annular grooves formed in the outer surface of the cylinder 238, such as those expandable bands and annular grooves shown in U.S. Pat. No. 6,415,895, POSITION-SENSITIVE SHOCK ABSORBER, by Marking et al., assigned to Fox Factory, Inc., and incorporated herein in its entirety by reference thereto. In this situation, the expandable bands that block the bypass openings act as check valve elements. The check valve elements permit fluid flow from the damping fluid chamber 230 to the cylindrical bypass channel 216 but restrict, and typically prevent, fluid flow in the opposite direction. Thus, the shock absorber 200 will exhibit different damping characteristics along the same segment of the stroke depending upon whether the stroke is the compression stroke or the rebound stroke.

Figure 2D:
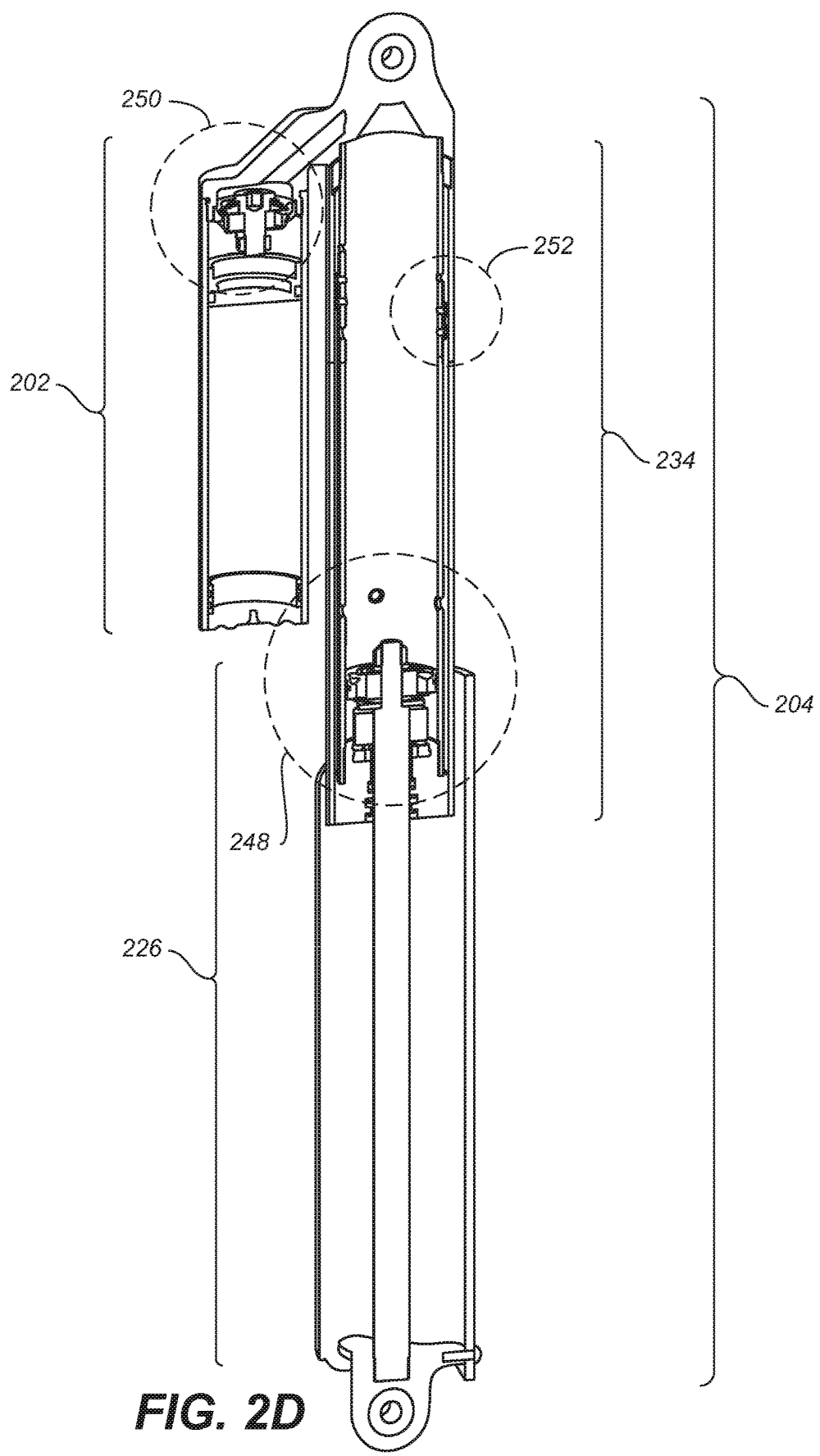
FIG. 2D depicts a side cross-sectional view of the shock absorber of FIG. 2A, in accordance with an embodiment.

FIG. 2D depicts a side cross-sectional view of the shock absorber 200 of FIG. 2A, in accordance with an embodiment. The shock absorber 200 includes the main body 204 and the reservoir 202. The main body 204 includes the concentric cylinder bypass damper 234 slidably integrated with the air sleeve 226. The concentric cylinder bypass damper 234 includes the piston assembly 248 (See FIG. 2E) and the set of bypass openings 252 (See FIG. 2G). The reservoir 202 includes the fluid metering valve/floating piston assembly 250 (See FIG. 2F).

FIG. 2E depicts the piston assembly 248 of FIG. 2D, in accordance with an embodiment. The piston assembly 248 includes the damping piston 218 and the damping piston seal 220 slidably integrated with the shaft 224).

FIG. 2F depicts the fluid metering valve/floating piston assembly 250 of FIG. 2D, in accordance with an embodiment. The fluid metering valve/floating piston assembly 250 includes the fluid metering valve 208 and the floating piston 212, sandwiching the reservoir chamber 210.

FIG. 2G depicts the set of bypass openings 252 of FIG. 2D, in accordance with an embodiment.

Example Air Spring Integrated with Concentric Cylinder Bypass Damper

Figure 3A:
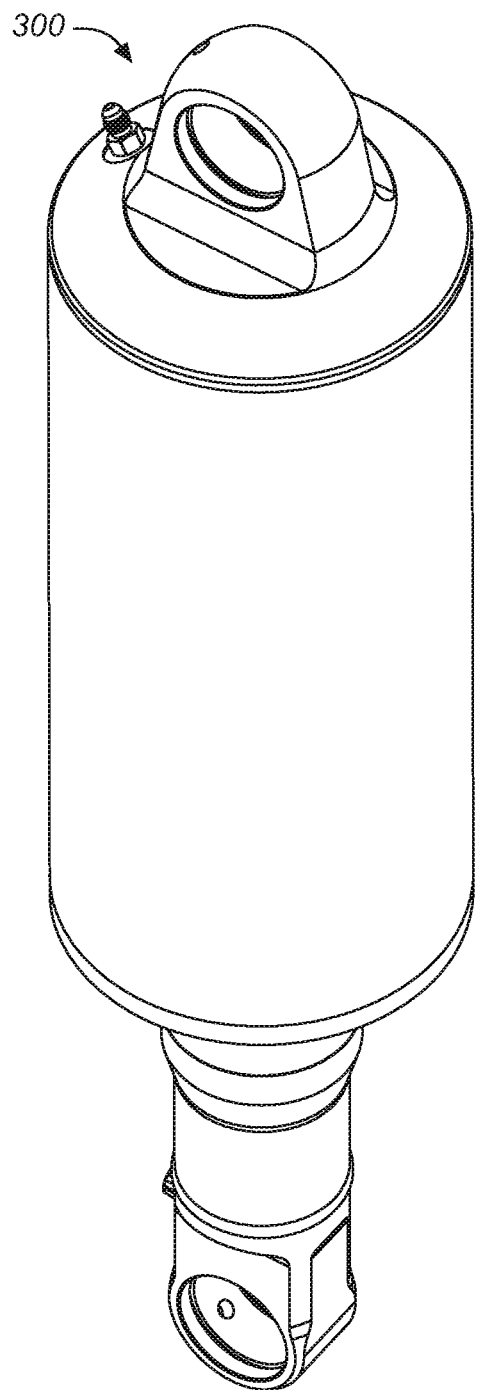
FIG. 3A depicts a side perspective view of a shock absorber, having an air spring and a concentric cylinder bypass damper, in accordance with an embodiment.

Embodiments of the present technology include the concentric cylinder bypass damper 48 or the concentric cylinder bypass damper 234 integrated with an air spring, as will be described herein. Referring now to FIG. 3A, a side perspective view of a shock absorber 300, having an air spring with a concentric cylinder bypass damper therein, in accordance with an embodiment.

Figure 3C:
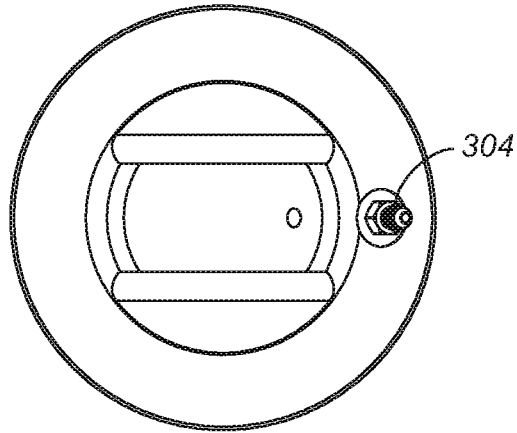
FIG. 3C depicts a top perspective view of the shock absorber of FIG. 3A, showing a fitting, in accordance with an embodiment.
Figure 3D:
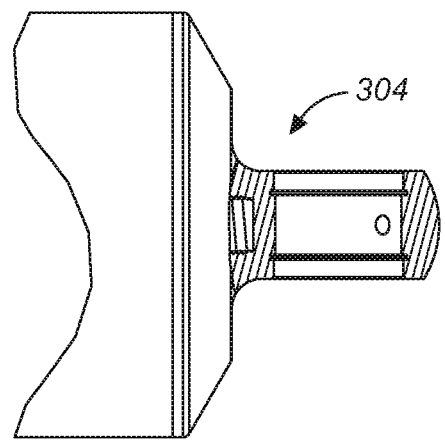
FIG. 3D depicts a side perspective view of the fitting of FIG. 3C, in accordance with an embodiment.
Figure 3B:
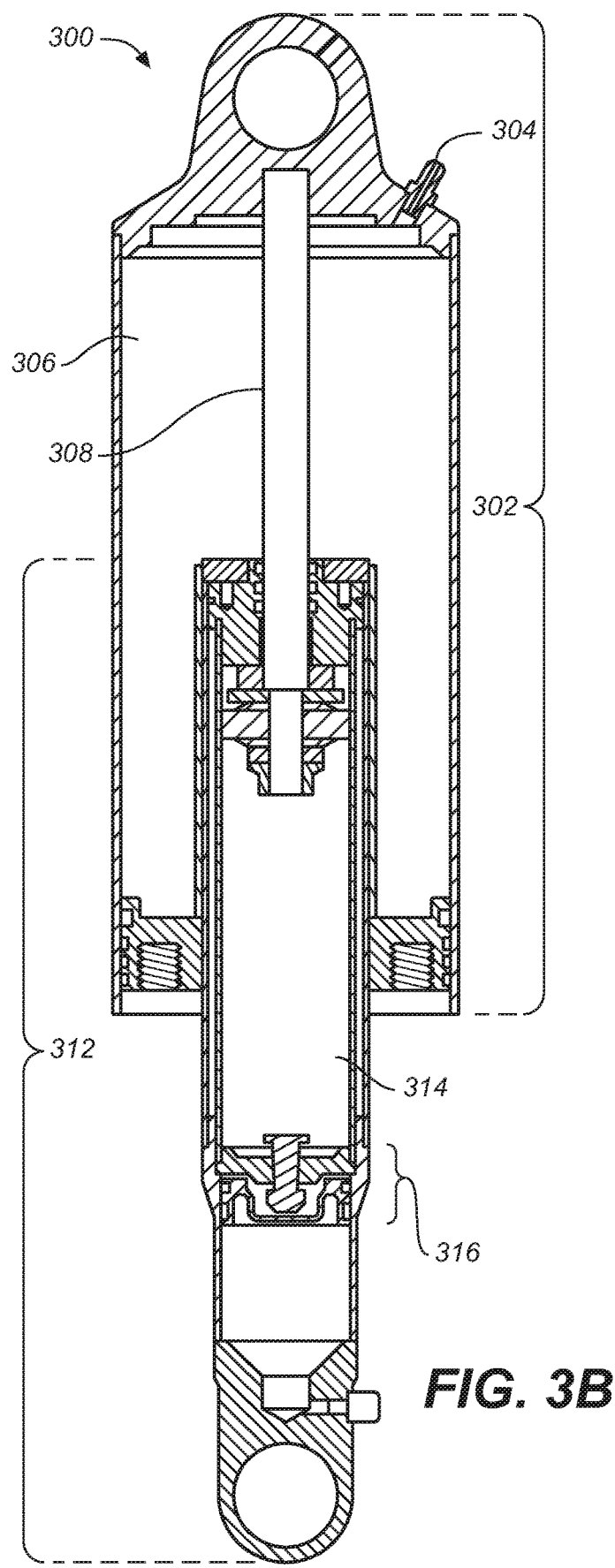
FIG. 3B depicts a side cross-sectional view of a shock absorber, having an air spring and a concentric cylinder bypass damper, in accordance with an embodiment.

More particularly, and with reference to FIG. 3B, a side cross-sectional view of the shock absorber 300 of FIG. 3A is shown, having the air spring 302 with a concentric cylinder bypass damper 312 slidably engaged therein, in accordance with an embodiment. As shown, the air spring 302 includes the air spring chamber 306 and the shaft 308. A fitting 304 is disposed at the top of the air spring 302. The fitting 304 is configured for enabling an entry of air into the air spring chamber 306.

The air spring chamber 306 has only air within, in one embodiment. As compression of the shock absorber 300 occurs, the concentric cylinder bypass damper 312 moves further into the air spring chamber 306 of the air spring 302. As the concentric cylinder bypass damper 312 moves further into the air spring chamber 306, the shaft 308 moves further into the damping fluid chamber 314 of the concentric cylinder bypass damper 312. As noted herein, in one embodiment, the concentric cylinder bypass damper 312 is the concentric cylinder bypass damper 2, while in another embodiment, the concentric cylinder bypass damper 312 is the concentric cylinder bypass damper 234. As such, the damping fluid chamber 314 operates in one embodiment as the damping fluid chamber 14, while in another embodiment, operates as the damping fluid chamber 230.

Upon the movement of the concentric cylinder bypass damper 312 into the air spring chamber 306, a damping effect occurs. The strength of the damping effect is determined by the amount of air pressure that is within the air spring chamber 306. As the concentric cylinder bypass damper 312 enters the air spring chamber 306 the volume of the air spring chamber 306 is increased. The air within the air spring chamber 306 provides the resistance to the movement of the concentric cylinder bypass damper 312 therein.

FIG. 3C is a top perspective view of the shock absorber of FIG. 3A, showing the fitting 304, in accordance with an embodiment. FIG. 3D is a side perspective view of the fitting 304 of FIG. 3A, in accordance with an embodiment.

Thus, the shock absorber 300 of FIGS. 3A-3D provides the concentric cylinder bypass damper 312, which enables a damping effect to occur, coupled with the air spring 302, which enables a further damping effect to occur. The damping effect can be tuned by increasing or decreasing any of, but not limited to, the following: air pressure within the air spring chamber 306; size of the air spring chamber 306 within the air spring 302; number and placement of bypass openings within the concentric cylinder bypass damper 312; and amount of fluid allowed to flow through the fluid metering valve 316 (via various configurations of the fluid metering valve 316). Of note, the fluid metering valve 316 in one embodiment is the fluid metering valve 8, while in another embodiment, the fluid metering valve 316 is the fluid metering valve 208.

Figure 3E:
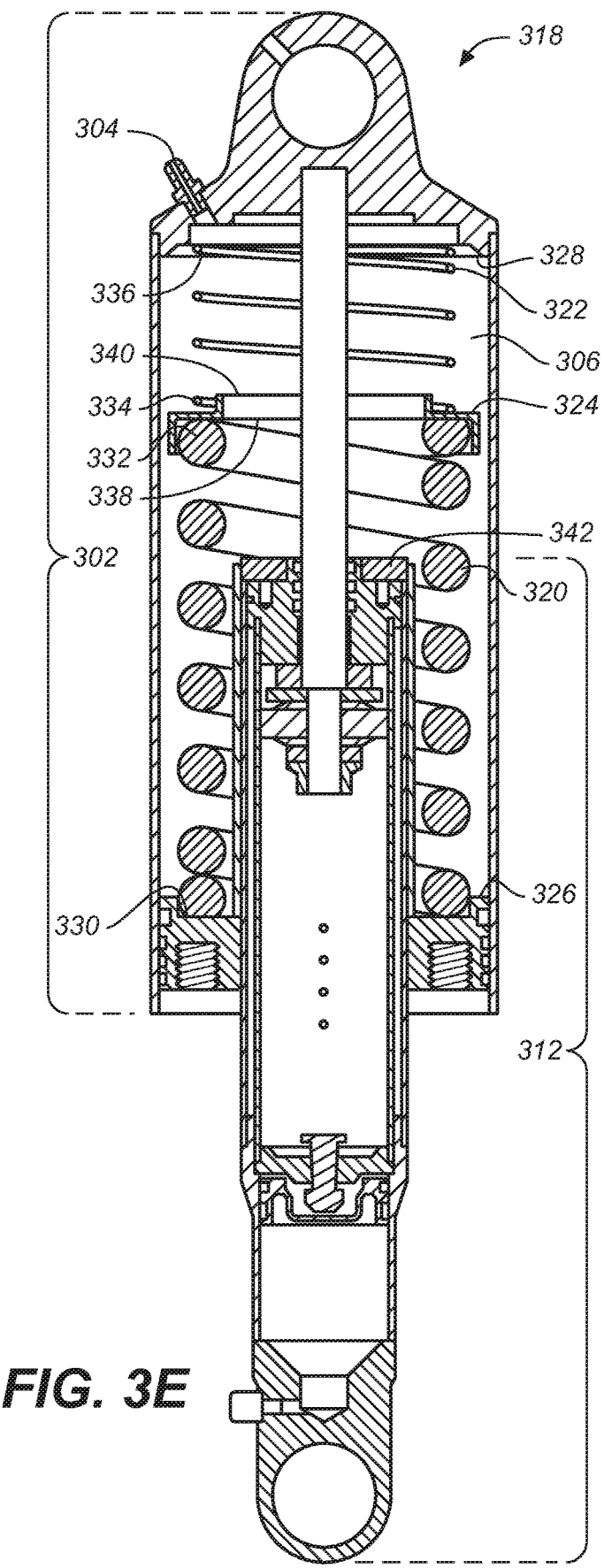
FIG. 3E depicts a side cross-sectional view of a shock absorber, in accordance with an embodiment.

FIG. 3E depicts a side cross-sectional view of a shock absorber 318, in accordance with an embodiment. The shock absorber 318 includes all of the components of the shock absorber 300 described herein. Additionally, the air spring 302 of the shock absorber 318 of FIG. 3E also includes a set of coiled springs configured for reducing the speed of the compression of the concentric cylinder bypass damper 312 into the air spring chamber 306. The set of coiled springs may include one or more lengths of coiled springs, one or more types of coiled springs and one or more sizes of coiled springs. The set of coiled springs is disposed within the air spring chamber 306 such that upon the compression of the shock absorber 318, the coiled springs are positioned to provide resistance to the concentric cylinder bypass damper 312 from entering the air spring chamber 306.

For example, and with reference to FIG. 3E, the first coiled spring 320 and the second coiled spring 322 are positioned in series with each other, and separated by the coiled spring separator 324.

The first end 330 of the first coiled spring 320 is positioned at the first end 326 of the air spring chamber 306. The second end 332 of the first coiled spring 320 is positioned against the first surface 338 of the coiled spring separator 324.

The first end 334 of the second coiled spring 322 is positioned against the second surface 340 of the coiled spring separator 324. The second end 336 of the second coiled spring 322 is positioned at the second end 328 of the air spring chamber 306.

The first coiled spring 320, in one embodiment, is longer in length, and is greater in compressive strength than the second coiled spring 322. Thus, the placement and the disposition of the first coiled spring 320 provide resistance to the expansion of the second coiled spring 322 toward the first coiled spring 320.

The coiled spring separator 324 provides a mechanism by which the first coiled spring 320 may engage with the second coiled spring 322, regardless of each coiled spring's length, type, and size. The diameter of the coiled spring separator 324 is larger than the diameter of either the first coiled spring 320 or the second coiled 322, measured from the outer edges of the first coiled spring 320 and the second coiled spring 322. Thus, in operation, the second end 332 of the first coiled spring 320 pushes against the first surface 338 of the coiled spring separator 324 and the first end 334 of the second coiled spring 322 pushes against the second surface 340 of the coiled spring separator 324.

The placement of the first coiled spring 320 and the second coiled spring 322 does not interfere with the sliding movement of the concentric cylinder bypass damper 312 within the air spring chamber 306. The diameter of the first coiled spring 320, measured from its inner edge, is greater than the diameter of the concentric cylinder bypass damper 312, such that the concentric cylinder bypass damper 312 may move within the interior area of the first coiled spring 320 without touching the first coiled spring 320.

Upon compression of the shock absorber 318, the concentric cylinder bypass damper 312, moves further into the air spring chamber 306. Upon further compression of the shock absorber 318, the concentric cylinder bypass damper 312 moves further into the air spring chamber 306. In one embodiment, upon a continued compression of the shock absorber 318, the top surface 342 of the concentric cylinder bypass damper 312 pushes against the first surface 338 of the coiled spring separator 324 (the concentric cylinder bypass damper 312 pushes against the coiled spring separator 324). When the concentric cylinder bypass damper 312 pushes against the coiled spring separator 324, the second surface 340 pushes against the first end 334 of the second coiled spring 322. The second coiled spring 322 provides resistance to the movement of the coiled spring separator 324 in its direction.

Thus, the combination of the first coiled spring 320 and the second coiled spring 322 engaged with the coiled spring separator 324 provides a further source of damping. In addition to the operation of the coiled springs and as described herein, the air within the air spring chamber 306 provides yet another source of tunable damping for the shock absorber 318.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

What we claim is:

1. A shock absorber comprising:
   a cylinder having an interior and a cylindrical axis, said cylinder having a first end and a second end, said first end disposed separated from said second end along said cylindrical axis, wherein said interior comprises a damping fluid chamber and a damping piston, said damping piston mounted on a first end of a shaft, wherein said first end of said shaft is retained within said interior of said cylinder and movable along at least a portion of said cylindrical axis such that said damping piston is movable within said interior of said cylinder between said first end and said second end;
   a first bypass opening configured for opening into said damping fluid chamber at a first axial position of said cylinder;
   a second bypass opening configured for opening into said damping fluid chamber at second axial position of said cylinder, said first axial position and said second axial position being spaced apart from each;

a bypass channel fluidly coupling said first bypass opening and said second bypass opening;

a reservoir chamber;

a gas chamber;

a floating piston disposed separating said gas chamber and said reservoir chamber; and a fluid metering valve disposed to meter fluid flow between said damping fluid chamber and said reservoir chamber during at least one of a compression stroke of said shock absorber and a rebound stroke of said shock absorber, said fluid metering valve affecting damping of said shock absorber during normal operation of said shock absorber, said fluid metering valve and said floating piston defining said reservoir chamber there between.

2. The shock absorber of claim 1, wherein said shock absorber further comprises:

a coiled spring, wherein said coiled spring provides resistance during said compression stroke of said shock absorber.

3. A shock absorber comprising:

a cylinder comprising:

a concentric cylinder bypass damper comprising:

an interior comprising:

a damping fluid chamber; and a set of bypass openings configured for providing damping while a portion of a fluid, within said damping fluid chamber of a first portion of said interior, flows through at least one bypass opening of said set of bypass openings to a second portion of said interior; and a fluid metering valve configured for metering a second portion of said fluid through said fluid metering valve;

a reservoir chamber;

a gas chamber; and a floating piston disposed separating said gas chamber and said reservoir chamber, said reservoir chamber disposed between said floating piston and said fluid metering valve, said fluid metering valve affecting damping of said shock absorber during normal operation of said shock absorber, said floating piston configured for moving into said gas chamber when said second portion of said fluid enters said reservoir chamber.

4. The shock absorber of claim 3 further comprising:

a coiled spring, wherein said coiled spring provides resistance during a compression stroke of said shock absorber.

* * * * *